United States Patent [19]
DeLeon

[11] 3,899,831
[45] Aug. 19, 1975

[54] PLATE LENGTH MEASURING GAGE

[75] Inventor: Walter L. DeLeon, Pasadena, Tex.

[73] Assignee: United States Steel Corporation, Pittsburgh, Pa.

[22] Filed: Sept. 12, 1973

[21] Appl. No.: 396,640

[52] U.S. Cl. .............................. 33/141 B; 33/143 L
[51] Int. Cl. ............................................. G01b 7/04
[58] Field of Search .......... 33/141 R, 141 B, 125 M, 33/129, 134 A, 142, 143 R, 143 L

[56] References Cited
UNITED STATES PATENTS
2,659,154   11/1953   Rendel ............................. 33/147 L FOREIGN PATENTS OR APPLICATIONS
368,211   3/1932   United Kingdom ............... 33/141 B

*Primary Examiner*—Richard E. Aegerter
*Assistant Examiner*—Willis Little
*Attorney, Agent, or Firm*—Rea C. Helm

[57] ABSTRACT

A length measuring gage for a steel plate mill has a pulse generator connected to a work roll for providing pulses which are representative of length increments of the circumference of the roll. The pulses are counted in an accumulator which is gated to count when roll separating force load cells indicate usable product is being rolled. A variable ratio gear box connected between the work roll and the pulse generator permits calibration of the pulse generator to provide an accumulator total directly in inches for a particular measured work roll circumference.

2 Claims, 1 Drawing Figure

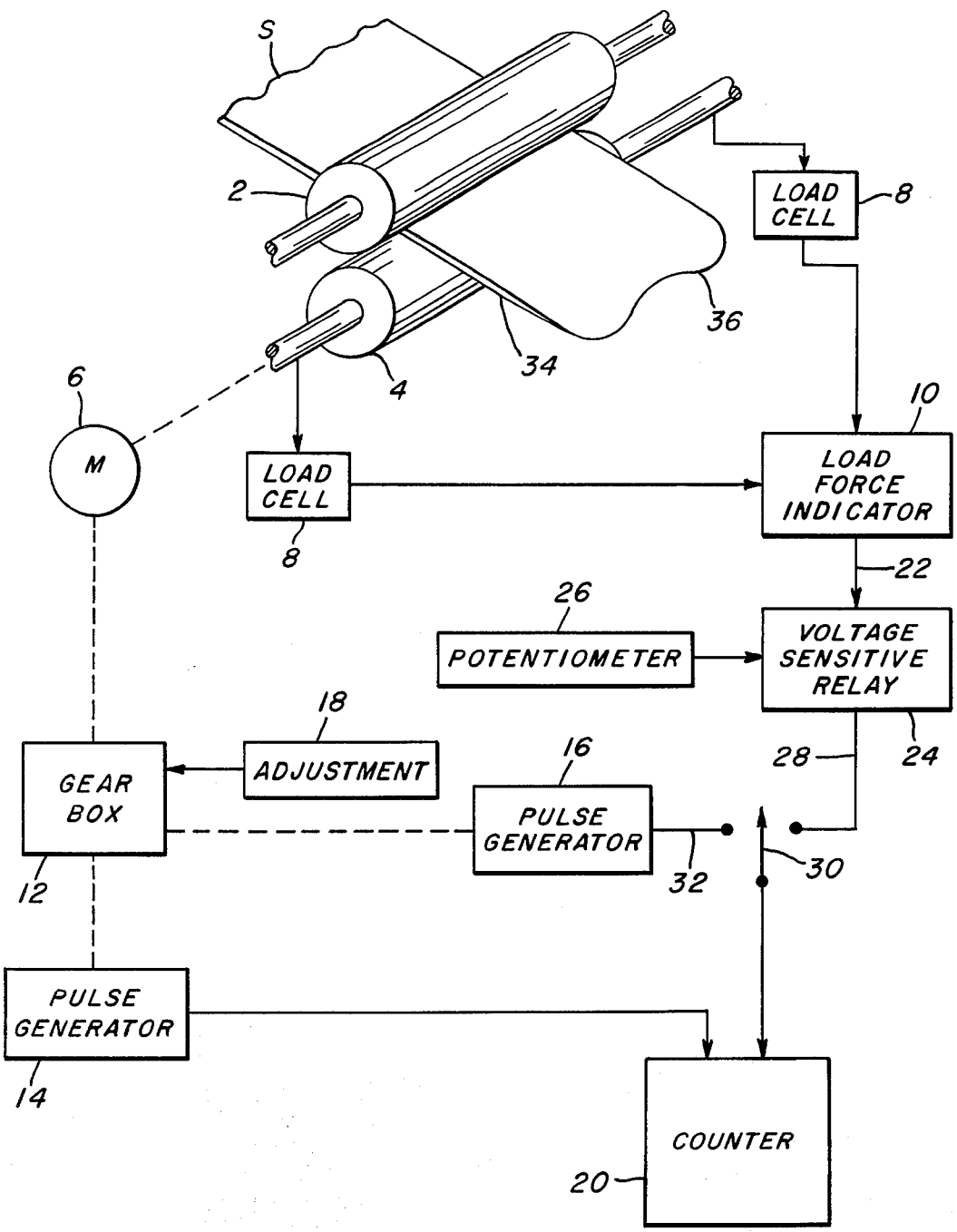

PLATE LENGTH MEASURING GAGE

This invention relates to a plate measuring gage and more particularly to a gage for measuring the length of a hot steel slab as it is being rolled into a plate in a plate mill.

Steel plates are produced by passing a hot steel slab back and forth between the rolls of a reversing mill, reducing the thickness each pass until the slab is considerably elongated and reduced to the desired plate thickness. Plates are usually ordered by a customer in specific lengths within small length tolerances. A single slab is typically rolled to provide two or more plates, and based upon the size of the starting slab and the desired finish plate thickness, calculations are made to provide a combination of desired plate lengths and at the same time achieve maximum yield from the slab.

The slabs are rolled so that at the final, or next to final pass through the rolls, the thickness of the plate will be on the high side of the permitted thickness range of the finished plate and a thickness measurement made to determine if the plate is either within or close to the permitted thickness range. The length of the plate is then determined by visual observation of the plate ends matching length scale marks on the mill run out table. The operator then determines if an additional pass is necessary, and if so, what additional thickness reduction will provide the desired length.

The visual observation of length measurement is not accurate and sometimes it is difficult to properly measure the length because "fish tails," the tapered and rounded ends of the plate resulting from the ends passing between the rolls, obscure the locations where a plate must be sheared or cut for the desired lengths.

In accordance with my plate measuring gage, a pluse generator, calibrated to provide pulses representative of length increments of the circumference of a rotating work roll of a plate mill, provides pulses which are passed through a gate and accumulated in a counter. The gate begins the accumulation when load cells in the rolling mill housing mounted for measuring the rolling force indicate that the usable part of the workpiece at the starting end is between the rolls, and stops the accumulation when the load cells indicate that the usable part of the workpiece at the opposite end is no longer between the rolls. The accumulation is displayed in the operator's mill control pulpit providing an accurate length measurement for each particular pass and the counter is then reset for the next pass.

It is therefore an object of my invention to provide apparatus for accurately measuring the length of a hot steel plate as it is being rolled.

Another object of my invention is to provide apparatus that will measure only the usable portion of a plate as it is being rolled.

These and other objects will become more apparent after referring to the following specification and drawing in which the single FIGURE is a schematic diagram of the apparatus of my invention.

Referring now to the drawing, reference numeral 2 refers to a top working roll of a late mill and reference numeral 4 refers to a bottom work roll of a plate mill. The bottom roll is shown as being driven by a motor 6. Load cells 8 are located in the housing (not shown) for rolls 2 and 4 for measuring the force separating rolls 2 and 4 when the workpiece S is between the rolls. Load cells 8 are connected to a load force indicator 10. The parts thus far described are conventional components in modern plate mills, indicator 10 is usually located in the operator's control pulpit for his use in operating the mill.

Motor 6 is connected to drive an adjustable ratio gear box 12. Gear box 12 drives two pulse generators 14 and 16. Pulse generator 16 is connected to provide a single pulse for each single revolution of roll 4. Pulse generator 14 is connected to provide a variable number of pulses for each revolution of roll 4, the number is adjusted by a ratio adjustment motor 18 having a control switch in the oeprator's control pulpit. Gear box 12 may be a P.I.V. variable ratio gear box manufactured by the Link-Belt Corporation and pulse generators 14 and 16 each may be a Tru-Rota Pulse Generator manufactured by the Trump-Ross Company. Pulse Generator 14 has an output connected to a pulse input of a pulse counter 20 such as a Frequency Counter Model 5321B manufactured by the Hewlett-Packard Company.

Load cells 8 are preferably load cells having a linear output such as Pressductor Type QGPCB (2,800 metric ton) manufactured by Allmanna Svenska Elektriska Aktiebolaget of Vasteras, Sweden. Load force indicator 10 has a voltage output 22 connected to a voltage sensitive relay and signal source 24. A potentiometer 26 is also connected to relay 24. Relay 24 has a signal output 28 connected to a single pole double throw switch 30. Pulse generator 16 has an output 32 connected to switch 30 which is connected to a gate input of counter 20.

In operation switch 30 is placed to connect pulse generator 16 to counter 20 for calibration of the gage. The circumference of roll 4 is accurately measured, preferably in inches. Motor 6 is then rotated so that both pulse generators 14 and 16 are providing pulses. Pulse generator 16 provides one pulse for each revolution of roll 4 and each pulse acts as a gate, resetting counter 20 upon the occurrence of each pulse. The speed of pulse generator 14 is now changed by the ratio adjustment motor 18 until the number of pulses from pulse generator 14 for each pulse from pulse generator 16 is equal to the number of inches measured on the circumference of roll 4. The gage is now calibrated in inches for a specific diameter of work roll. No further calibration is required until roll 4 is replaced with another work roll having a different diameter.

The ends of the slab tend to become tapered as shown at 34 and to become rounded or "fish tailed" as shown at 36, as the slab is passed back and forth between the rolls. Tapered and rounded ends are not usable product and must be sheared or cut off. Since the roll separating force will be relatively constant when the full thickness and width of the slab is being rolled and will vary as the tapered ends of the slab enter and leave the rolls, the magnitude of the roll separating force may be used to determine when usable product is being rolled. Potentiometer 26 is adjusted so that voltage sensitive relay and signal source 24 will provide output 28 whenever the magnitude of output 22 indicates that the plate is entirely between rolls 2 and 4. The linear response of load cells 8 facilitates the determinatin of the proper setting for potentiometer 26 since temperature variations, composition, and other factors influence the roll separation forces.

In rolling, the operator normally sets the roll gap for each pass according to a predetermined pass pattern.

Switch 30 is moved to connect output 28 to counter 20. Prior to the next to final pass, the operator resets and clears counter 20. When the plate starts into the rolls, gating signal 28 derived from the desired level of signal 22 from the load force indicator 10 allows counter 20 to start counting pulses from pulse generator 14. As the late leaves the mill, gating signal 28 is removed stopping the accumulation and the counter then displays the length of the plate just rolled. The thickness of the plate is measured and calculations are made to determine the roll gap setting for the final pass so that the desired length will be rolled. The roll gap is adjusted according to the calculations and the final pass is made, using the gage to determine if the aim length was achieved.

The gage is very accurate and its use results in substantial elimination of scant or short lengths. By rolling the next to final pass on the high side of the range of thickness tolerance the final desired length is usually attainable because the thickness tolerance is fairly large and a few thousandths of an inch difference in thickness is equivalent to a substantial difference in overall length.

The components of the gage are simple to maintain because most of the components are not in the vicinity of the mill itself. No measuring marks or scales need be maintained on the runout table and no personnel are involved in determining where usable product begins and ends on the runout table. The gage automatically and immediately provides the length measurement where it is needed, in the operator's control pulpit. The gage automatically operates in either rolling direction.

While gear box 12 is shown in connection with bottom roll 4, obviously top roll 2 could also be used for length determination. Load cells 8 could also be directly connected to voltage sensitive relay and signal source 24, but where signal 22 is already available, its use is more convenient. The use of the gage need not be confined to a plate mill, but it may be used on any mill where the rotation of the rolls may be related to the length of a workpiece having tapered ends.

While I have shown and described several embodiments of my invention, it is apparent that other modifications may arise.

I claim:

1. In a rolling mill, a pair of opposed work rolls, means for measuring the force separating said work rolls when a workpiece is displaced therebetween, and a gage for measuring usable lengths of a workpiece as it passes between the work rolls comprising, means connected to a work roll for providing pulses representative of increments of length of the circumference of the work roll as the work roll rotates, means connected to said means for providing pulses for counting said pulses, a voltage sensitive relay and signal source connected to the means for measuring the force separating said rolls and the means for counting the pulses for supplying a signal to said means for counting the pulses whenever the means for measuring the force separating said rolls indicates that the workpiece is entirely between said rolls, and a potentiometer connected to said means for counting pulses and said voltage sensitive relay and signal source whereby when the force of the rolls upon the workpiece causes the means for measuring the force separating the work rolls to measure an increase in force to a value determined by a setting of said potentiometer said signal source is connected to said means for counting pulses.

2. A gage according to claim 5 in which the means for providing pulses includes aa variable ratio gear box connected to said work roll, a first pulse generator connected to said variable ratio gear box for providing a pulse for each revolution of said work roll, a second pulse generator connected to said variable ratio gear box and to said means for counting pulses and means connecting said first pulse generator to said means for counting pulses whereby the gear box ratio may be varied to provide a number of pulses from the second pulse generator representative of the number of increments of measured lengths of the circumference of the work roll for each pulse generated by the first pulse generator.

* * * * *

UNITED STATES PATENT OFFICE
CERTIFICATE OF CORRECTION

Patent No. 3,899,831     Dated August 19, 1975

Inventor(s) Walter L. DeLeon

It is certified that error appears in the above-identified patent and that said Letters Patent are hereby corrected as shown below:

Column 1, line 61, "late" should read -- plate --.

Column 2, line 12, "oeprator's" should read -- operator's --;

lines 63 and 64, "determinatin" should read -- determination --.

Volum 3, line 7, "late" should read -- plate --. Column 4, claim 2, line 1, "5" should read -- 1 --; claim 2, line 3, "aa" should read -- a --.

Signed and Sealed this

*second* Day of *December 1975*

[SEAL]

*Attest:*

RUTH C. MASON
*Attesting Officer*

C. MARSHALL DANN
*Commissioner of Patents and Trademarks*